May 10, 1938. C. P. GRIFFITH 2,116,785
REPEATING METER
Filed Nov. 30, 1934 6 Sheets-Sheet 1

Inventor:
Clement P. Griffith
By Cox + Moore attys

May 10, 1938.　　　C. P. GRIFFITH　　　2,116,785
REPEATING METER
Filed Nov. 30, 1934　　　6 Sheets-Sheet 5

May 10, 1938.  C. P. GRIFFITH  2,116,785
REPEATING METER
Filed Nov. 30, 1934  6 Sheets-Sheet 6

Inventor:
Clement P. Griffith
By: Cox + Moore
attys.

Patented May 10, 1938

2,116,785

UNITED STATES PATENT OFFICE 2,116,785

REPEATING METER

Clement P. Griffith, Fort Wayne, Ind., assignor to S. F. Bowser & Company, Inc., Fort Wayne, Ind., a corporation of Indiana Application November 30, 1934, Serial No. 755,386

9 Claims. (Cl. 221—101)

My invention relates to liquid dispensing devices and more particularly to a liquid dispensing device adapted to dispense repeated quantities of gasoline which may be of varying gallonages, or a repetition of the same gallonage.

Among the objects of my invention are to provide a liquid dispensing device having predetermining mechanism which may be manually set to indicate the amount of liquid to be dispensed, plus movable indicating mechanism, movable by the flow of liquid through the meter when the control valve is open and including mechanism for automatically stopping the flow when the movable indicating mechanism arrives at the predetermined gallonage setting and including instrumentalities whereby when the movable indicating mechanism is returned to zero or initial position, a further amount of liquid exactly corresponding to the previous delivery can be dispensed without a resetting of the predetermining mechanism; to provide a dispensing mechanism including a plurality of settable dials, one for small gallonages up to say, fifty (50) and the other from say fifty (50) to say two thousand (2000) gallons together with movable gallonage indicating hands, the one for the smaller gallonage amount and the other for the larger gallonage amount, together with a control valve and a control mechanism whereby when repeat quantities of the identical gallonages for which the predetermined mechanism is set may be delivered by merely returning the indicating mechanism to zero position and opening the control valve each time that a repetition is desired; to provide a dispensing device constructed to operate so that when the device has been set for a particular quantity and that quantity has been delivered, the device will repeat and dispense the same quantity indefinitely if the operator returns the indicating hands to zero each time before opening the control valve; to provide an automatic dispensing meter comprising a plurality of turnable operator's dials adapted to be independently and turnably set to indicate gallonage to be dispensed and automatically turnable due to the flow of liquid through the meter when the control valve is open and to automatically stop at the positions corresponding to the setting of the operator's dials and thereupon automatically to close the control valve and to indicate on suitably arranged customer's dials the amount of gallonage delivered; to provide a single control knob for the herein-described mechanism whereby upon manipulation of this single control knob, the indicating hands may be reset to zero position and thereafter the operator's dials may be independently set to any desired positions to indicate varying gallonages to be delivered; to provide an automatic dispensing device of the type hereinbefore referred to comprising two independently operable operator's dials and two independently operable indicating hands, all manipulated from a single control knob which is adapted to reset the hands to zero position and/or with a continuous movement in the same direction to reset the dials to a new setting which will automatically stop the flow through the meter when a corresponding gallonage has been dispensed; to provide a new type of meter controlled liquid dispensing device comprising a meter having two concentrically located customer's dials, one of said dials for arranging predetermined setting of smaller gallonages and the other of said dials for predetermined setting of larger gallonages, together with two indicating hands, one for indicating the flow of the smaller gallonages and the other for indicating flow through the meter of the larger gallonages together with concentrically disposed customer's dials—two in number—one to indicate the complete dispensing of the aforesaid larger gallonages and the other to indicate the complete dispensing of the hereinbefore described smaller gallonages; to provide mechanism which includes a single control knob for controlling the zero setting of the indicating hands and for controlling the setting of the operator's dials, together with mechanism operated by the operation of the meter as the dispensed liquid flows therethrough upon the opening of the valve for operating the hands from zero position to the dial set positions, and therefore automatically to stop the flow therethrough; to provide, in addition thereto, associated instrumentalities for permitting the repetition of the delivery of any gallonage for which the dials have been previously set, merely upon returning the indicating hands to zero position; to provide a novel arrangement of dials including the stationary customer's dial and two concentrically disposed, but shiftable operator's dials and two indicating hands, all arranged in a compact and novel manner for indicating, setting and controlling the flow of a predetermined quantity of liquid through the meter and for repeating the delivery of a predetermined quantity through the meter without resetting the dials; to provide novel mechanism for automatically stopping the flow of the dispensing fluid when a predetermined gallonage has been dispensed; to provide novel mechanism for preventing the closure of the delivery valve during the dispensing operation and until the exact predetermined quantity has been delivered; to provide novel mechanism for slightly, or partially closing the delivery valve just prior to the delivery of a predetermined amount of liquid whereby to avoid hammer action; to provide a simple type of control knob and mechanism connecting the same with a turnable predetermined dial setting mechanism and the hand setting mechanism whereby the hands are zeroized and the predetermined control dials are set to predetermined indicating position by turning of the handle uniformly in a single direction of rotation, preferable counterclockwise; to provide a control handle of the type indicated whereby an endwise shifting of the control knob is utilized for causing various operations of the control dials and/or hands; to provide mechanism whereby on an inward, endwise movement of the control knob and its rotation to the left, the indicating hands are automatically returned to zero and one of the operator's dials or setting dials is set to predetermined position and whereby upon an outward, endwise movement of the control knob the other operator's dial is set to its predetermined position; to provide a mechanism of the type described wherein a single control knob controls the setting of all three dials and in a manner such that the knob is always turned in the same direction; to provide a construction wherein if the knob is turned in the other direction, or clockwise direction, no control of the control dials or setting will take place; to provide a mechanism wherein when the control dial is released, the knob will return automatically to neutral position; to provide an intercontrol between the control valve and the dispensing line and the automatic setting mechanism whereby to hold the valve in open position when once opened until the exact predetermined quantity has been delivered and/or whereby to cause the automatic closure of the valve when the same has been delivered and/or to cause the partial closing of the valve just prior to the delivery of the predetermined amount and in a very simple manner; to provide these and other objects of my invention, as will appear from a perusal of the following specification when taken in connection with the accompanying drawings wherein.

Figure 5:
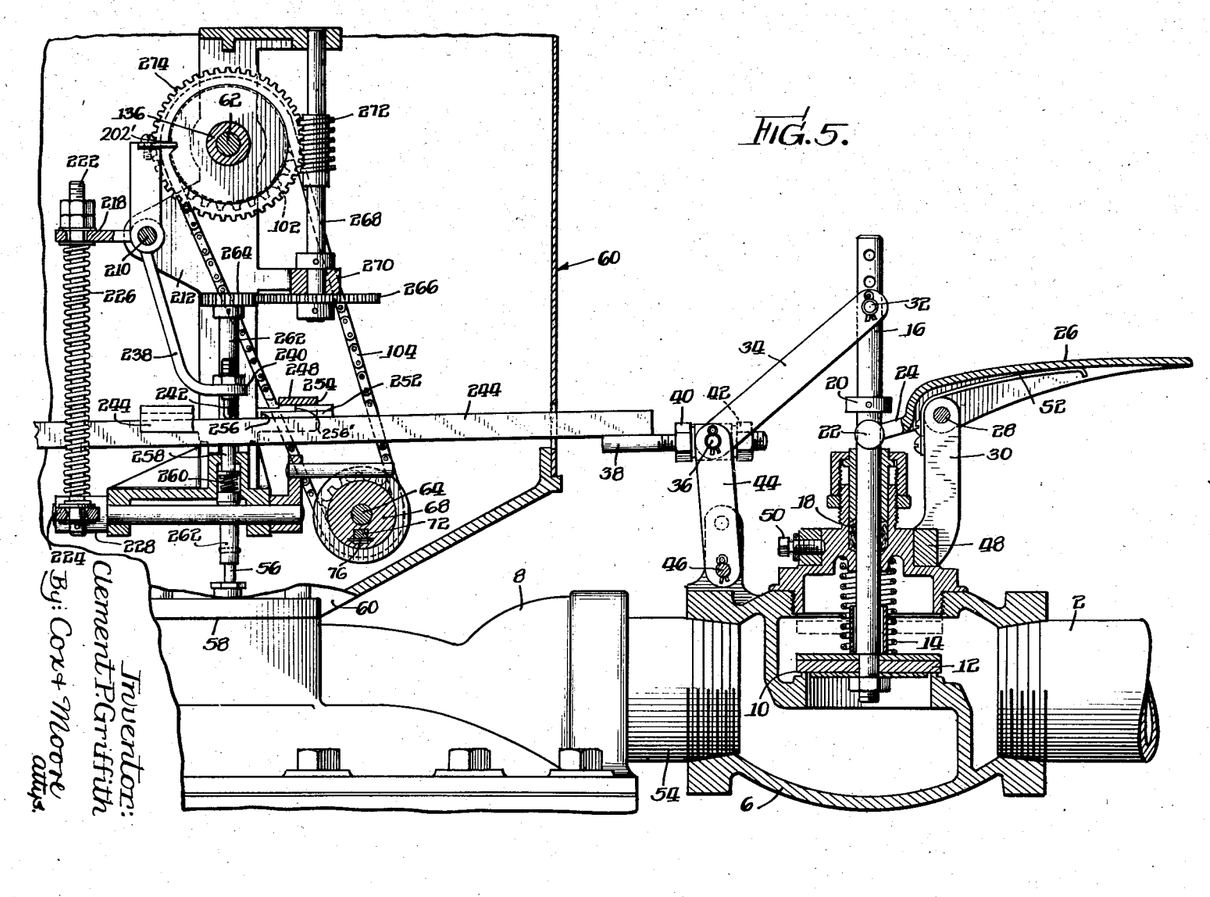
Fig. 5 is a section taken on line 5—5 of Fig. 4.

Referring now to the drawings in detail, my improved automatic metering device is adapted to be attached to a supply line 2 and is adapted to discharge through a dispensing line 4 provided with any suitable type of valve-controlled dispensing outlet. The device, in general, comprises a valve casing 6 and a meter and meter mechanism 8. By referring to Figure 5, it will be seen that the valve casing forms a housing for a valve seat 10 against which a valve 12 is adapted to close, being normally pressed to closed position by a spring 14 surrounding the valve stem 16 connected to the valve 18. The construction of the valve may be of any desired form. This valve stem projects outwardly through a packing 18 of the ordinary type. The upper portion of the stem is provided with a collar 20 adapted to engage a forked head 22 on an operating arm 24 provided with a handle 26. This handle is pivoted at 28 to an upstanding stationary arm 30 mounted rigidly on the housing 6 of the valve. The outer extremity of the valve stem 16 is provided with a series of perforations adjustable to receive, as by a pivoted pin 32, a link 34 in turn is pivoted to an adjustable head comprising a pin 36 on a rod 38. For purposes of adjustment, the outer end of this rod 38 is threaded and slidably receives the head, the adjustment being made by oppositely disposed nuts 40 and 42. The second link 44 is pivotally connected to the cross pin 36 and the opposite end of the link 44 is pivotally connected to a pin 46 mounted on the housing 6 of the valve. The arm 30 is detachably mounted on top of the valve 6 by means of an encircling collar 48 held by means of a screw 50. A spring 52, interposed on the underside of the handle 26 and connected by means of screws to the arm 30, is arranged to normally hold the handle 26 in elevated position as shown in Fig. 5.

The discharge side of the valve housing 6 connects with a pipe 54 which discharges into the inlet pipe 8 of the meter mechanism. The metering mechanism is of any desired type of volumetric displacement construction, such as the well-known type of Bowser meter, and includes a meter shaft 56 which is adapted to be rotated by the movement of the displacement mechanism during the operation of the meter by the flow under pressure of the liquid from the inlet pipe 54 of the meter to the discharge pipe 4 thereof. Inasmuch as the details of construction of this type of meter are well known in the art, no further description thereof will be made.

I prefer to mount the meter setting mechanism, including the dials, and the hands, and the mechanism for automatically stopping the flow through the meter when a predetermined quantity of liquid has been passed through the meter, and also the automatic quantity repeat mechanism for the meter, in a housing immediately on top of the meter housing itself. To this end the upper portion of the meter housing proper, 58, is formed flat and there is bolted thereto a second housing 60 in which the setting mechanism and repeat mechanism is mounted, the meter shaft 56 passing upwardly therethrough as indicated clearly in Fig. 5. The mechanism mounted within the housing 60 includes, among other elements, a dial setting shaft 62 and a control shaft 64, the latter being provided with a control knob 66 rigidly fastened thereto. In addition, the control shaft 64 is provided with a clutch member 68 in the form of a sleeve which is pinned to shaft 64 by means of a screw 70 whereby when the shaft 64 is moved endwise the clutch sleeve 68 will partake of the same motion and whereby when the shaft 64 is turned the sleeve 68 will likewise turn with it. This clutch sleeve 68 is provided with a transversely extended opening in which are slidably mounted two pawls 72 and 74. These two pawls are each provided with a cut-out in which is located a pin 76 and 78 which limits the upward movement of the pawls under the tension of the intermediately located spring 80 which is lodged in the bore or groove in which these pawls slide. The outer ends of these pawls are provided with a tapered surface as at 82 (see Figure 7) whereby such tapered surface may engage a correspondingly tapered surface on a clutch face hereinafter described. The clutch 68 is disposed between two opposed clutch members 84 and 86 which are respectively loosely mounted on the shaft 64 but are held from lateral movement by a finger 88 securely mounted on the main frame of the housing 60 by means of a screw 90. These fingers are identical. The lower portions of these fingers fit in an annular groove 92 whereby to hold these sleeves 84 and 86 from lateral movement while permitting their turning. The faces of the clutch members 84 and 86 are provided with ratchet teeth 94 and 96 arranged to engage the pawls 72 and 74 respectively so that when the handle 66 is pulled to the left, as shown in Fig. 4, the pawl 72 will engage the teeth 94 of clutch 84 to lock the sleeve 68 to the clutch 84 whereby to cause counterclockwise rotation of the clutch 84 upon corresponding rotation of the turning knob 66.

Figure 4:
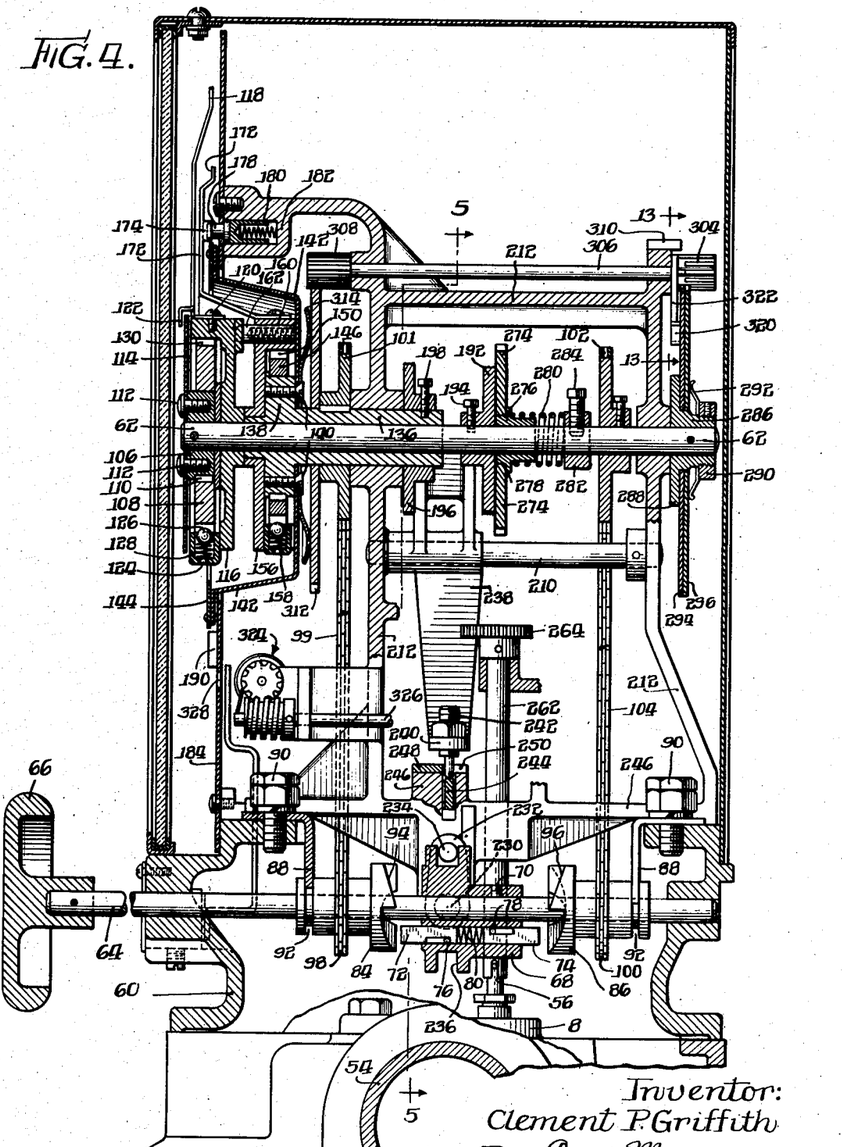
Fig. 4 is a sectional view taken on line 4—4 of Figure 1.

The teeth on clutch 86 are formed so that when sleeve 68 is shifted to the right, as in Fig. 4, and is pushed inwardly or pushed to the right, and when the knob 66 is turned in counterclockwise direction, the clutch 86 will correspondingly turn in a counterclockwise direction. The clutch 84 and clutch 86 each are provided with a sprocket wheel 98 and 100 respectively, the same being affixed to these clutch sleeves to rotate therewith.

The dial setting shaft 62 is provided with a sprocket wheel 102 which is fixed thereto to rotate therewith, and a chain 104, or drive, extends from wheel 100 to this sprocket wheel 102, so that when the shaft 64 is pushed inwardly and turned counterclockwise, rotary motion will be conveyed to the dial setting shaft 62. The extreme opposite end of the dial setting shaft 62 is provided with a collar 106 pinned thereto and mounted on the collar 106 is a gear 108, the same being connected thereto by a key 110. Suitable screws 112 affix a small dial plate 114 to the collar 106. A drum 116 is disposed to surround the outer periphery of the gear 108. Sleeve 136 carries a sprocket 101 splined thereon, the sprocket being drivingly connected as by means of a chain 99, with the sprocket portion 98 of the clutch element 84. The drum 116, as shown clearly in Fig. 4, is journalled for free rotation on the shaft 62. This drum, on its outer periphery, carries a fast moving hand 118 which is affixed thereto by suitable screws 120. The fast moving hand 118 is provided with an inwardly extending arrow 122 adapted to cooperate with the small dial face 114.

The drum 116 carries at the front portion of its periphery a spring socket 124 in which is lodged a ball 126 normally pressed inwardly by means of the coil spring 128 to engage the teeth 130 of the gear 108 so that when the dial setting shaft 62 is turned counterclockwise by means of the control knob 66, as hereinbefore described, the collar 106 will be correspondingly turned, which will turn gear 108 to turn through the teeth and pawl 126, the drum 116 which, in turn, correspondingly turns the large hand 118 and the arrow 122. Since this is a counterclockwise turn it will turn counterclockwise until the cam shoulder 170 of the cam face strikes the plunger 162 on the drum of the slow hand, hereinafter described, whereby the fast moving drum will then pick up the slow moving drum and move the slow moving drum counterclockwise until the slow moving drum hits a stop hereinafter described, at which time both hands will have returned to zero setting.

To this end, on the dial setting shaft 62 adjacent the fast movng drum 116 is loosely mounted a sleeve 136 which has an enlarged hub 138 through which screws 140 pass for holding a dish shaped housing 142, which extends forwardly and is adapted to carry at its outer face, a slow moving operator's dial 144.

Figures 9, 11, 12:
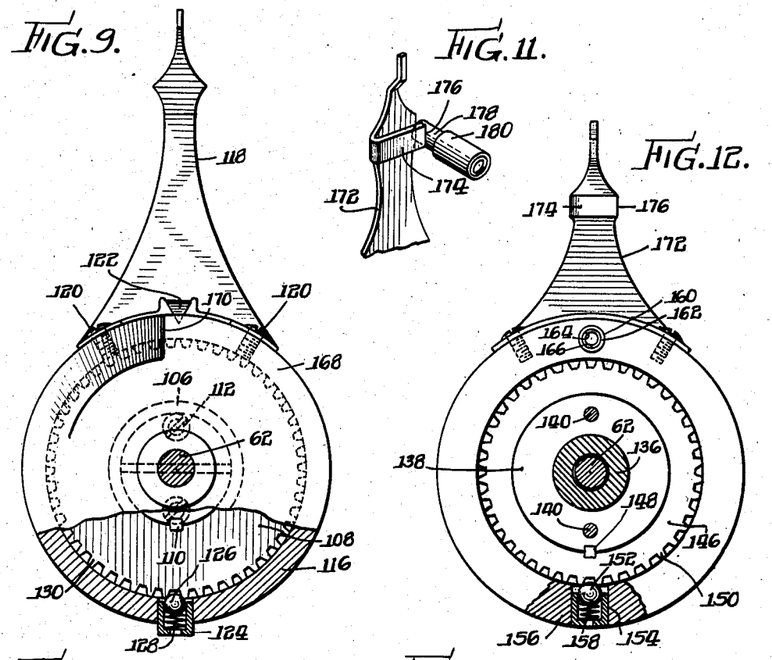
Fig. 9 is a view of the fast moving hand and drum.
Fig. 11 is a detailed perspective view of the slow moving hand showing the lug on the back.
Fig. 12 is a view of the slow moving hand and its drum.

In addition, a gear 146 is keyed as at 148 to the hub 138. This gear is provided with radial teeth 150 adapted to normally be engaged by a ball 152 mounted in a ball cup 154 carried by drum 156, a spring 158 pressing the ball normally in engagement with the teeth 150 of gear 146. This drum 156 constitutes the slow moving drum. This drum is provided with a hub which is journalled on a projection of sleeve 136. The drum 156 is provided with a transversely extending bore 160 in which there is lodged a plunger 162, which plunger is provided with another bore 164 (Fig. 12) in which is lodged a coil spring 166, the rear end of the spring pressing against the dish shaped plate 142 whereby the plunger 162 is resiliently forced outwardly against the face of a cam 168 on the rear face of fast moving drum 116. This cam is provided with a sharp shoulder 170 which constitutes a stop to engage the spring-pressed plunger 162 as hereinbefore described. It will thus be seen that if the fast moving drum is moved counterclockwise until the perpendicular shoulder 170 strikes the plunger 162, it will thereafter move the slow moving drum counterclockwise.

On the periphery of the slow moving drum 156 is likewise mounted a slow moving hand 172 which extends radially and forwardly outwardly. The rear face of the slow moving hand 172 is provided with a rearwardly extending arm 174 providing a perpendicular shoulder 176 adapted to strike against a spring-pressed plunger 178 housed within a sleeve 180 suitably mounted in a stationary part 182 of the main frame of the housing 60, so that when the slow moving hand 172 will have contacted the stop 178, both hands will come to a stop and this will correspond to the zero setting position of the hands. Any further counterclockwise movement of the slow and fast moving drums 156 and 116 respectively and hence the slow and fast moving hands carried thereby will cause the release of the spring-pressed balls 126 and 152 (see Figures 9 and 12 respectively) whereby permitting the hands to stay at the zero setting while thereafter permitting, upon predetermined directional sliding of the shaft 64 followed by subsequent counterclockwise turning of shaft 64 upon the knob 66, a further setting of the setting dials now about to be described.

Dial setting

As hereinbefore said, there are a number of dials. There is a customer's dial, which is printed directly upon the face plate 184 adapted to cooperate with the fast moving hand 118. This dial reads from zero up to fifty (50) gallons and the numerals such as 186 are placed on the outermost circle of the dial. Spaced inwardly therefrom are a series of numerals 188 arranged angularly, which read from zero to two thousand (2000) gallons. These numerals cooperate with the slow moving hand 172. Interiorly within this second, or stationary dial, are disposed two movable dials which are the operator's dials. These are the dials which are adjusted for the purpose of setting the predetermining mechanism. These dials are 144 and 114 respectively and have hereinbefore been referred to. The outer operator's dial 144 is mounted on the dish shaped plate 142 to rotate with the hub 138 whereas the inner operator's dial 114 is mounted on the hub 106 to rotate with the shaft 62. The outer operator's dial is graduated from zero to two thousand (2000) gallons, whereas the inner operator's dial is graduated from zero to fifty (50) gallons. The outer operator's dial is adapted to cooperate with a stationary arrow 190 fixed upon the plate 184, while the inner operator's dial is adapted to cooperate with arrow 122 on the fast moving hand 118, as hereinbefore described.

Setting the dials for any predetermined quantity from one to 2000 gallons is a simple matter, easily and quickly accomplished. For example, to set the dials to deliver 416 gallons, the control knob 66 is pushed inwardly and turned to the left, to-wit: counterclockwise. This, through the sprocket gearing 100, the chain 104, the sprocket 102 will operate the shaft 62, its hub 106, through the control dial 114 in a counterclockwise direction until the 16 mark on the dial coincides with a pointer 122 on the fast moving hand, which, of course, is at the zero position. This setting having been accomplished, the control knob is then pulled outwardly to the left, viewing Fig. 4, so as to bring the clutch 68 into contact with the clutch 84 in order to connect up the driving sprocket 98 and its chain 99 with sprocket 101 splined upon the hub 136. As hereinbefore described, this hub 136 carries the gear 146, and also carries the dished plate 142, which carries the outer operator's dial 144, hence this outer dial will likewise be turned counterclockwise until the arrow 190 coincides with the 400 gallon graduation thereon.

Mounted on the setting shaft 62 is a fast moving cam 192 which is pinned thereto by a screw 194. In addition, a slow moving cam 196 is mounted for rotation on sleeve 136, being fastened to it for rotation therewith by means of pin 198. Each one of these cams contains a peripherally disposed notch such as 200 and 202, which are adapted to cooperate with stops 204 and 206 rigidly carried by a sleeve 208 turnable on and with respect to a shaft 210 having bearings in a stationary bracket 212 carried by the frame of the machine. The sleeve 208 has an outwardly extending bracket or arm 214 provided with oppositely disposed perforated ears 216 and 218 through which pass rods 220 and 222. The opposite ends of the rods pass through openings in the oppositely extending arms of the bridge piece 224. As shown clearly in Fig. 5, these rods 220 and 222 pass freely through the perforations in the bracket 212 and in the bridge piece 224, but collars around the rods above and below these openings at each end, provide abutments between which the coil springs 226 are housed. As shown clearly in Figs. 7 and 8, the bracket arm 224 is provided with a central hub 228 in which is lodged a shaft 230 rigidly carrying at its opposite end an arm 232 having a shipper rod 234 connected therewith, which contacts in an annular groove 236 of the central or intermediate clutch 68. In this construction, no matter which way the clutch is shifted to correspond with the inward or outward push of the control knob 66, the shipper knob 234 is moved to the right, or to the left, to turn the connecting rod 230 to depress either end of the arms of the bridge piece 224, which in turn, through the spring and rod connections 225 and 226, depresses either end of the bracket 214 to thereby swing the bracket about its pivot 210, whereby to pull the stop arms 204 and 206 out of contact with the stop catches 200 and 202 on the cam, thereby releasing the cams for rotation.

By means of this construction the springs 226 function to maintain the bridge piece 224 in central position, which returns the rod 230 to central position and thence causes the shipper rod to return the clutch 68 back to central position and out of contact with the reversely disposed clutches 84 and 86.

The oscillating bracket 212 has a downwardly depending arm 238 which carries at an outwardly extending portion 240 an adjustable screw or stop 242 (see Fig. 7) which is adapted to cooperate with a locking bar 244 connected to the adjustable rod 38 on the valve mechanism (see Fig. 5). The stationary frame of the machine carries a secondary frame 246 which forms a support for a plate 248 which plate is arranged to straddle the control bar 244 and has a cut-out portion 250 in which the adjustable stop pin 242 depends.

Figure 6:
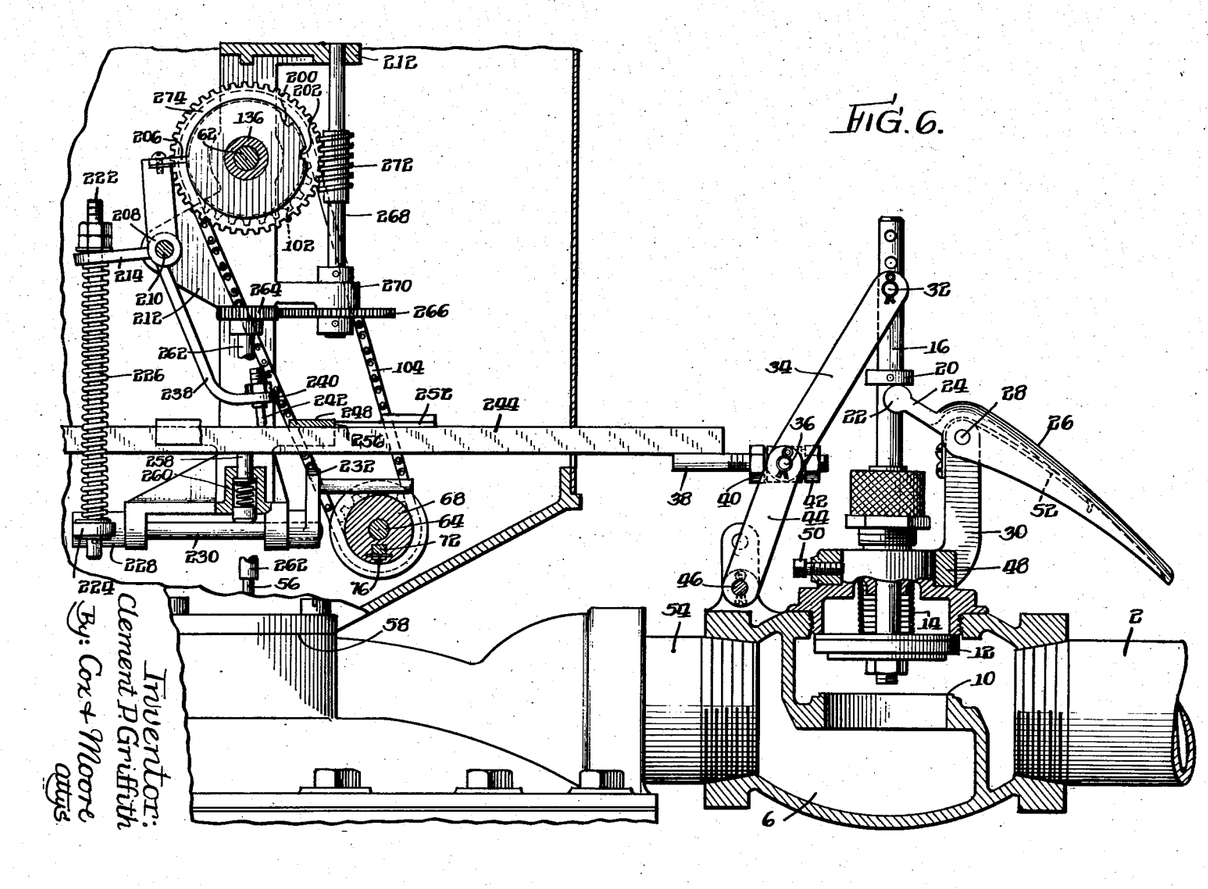
Fig. 6 is a similar section except that the parts as shown are changed to the position of the mechanism when the pump is operating.

On the bar 244 is a raised longitudinally extending shoulder 252 which is adapted to cooperate with plate 248. This plate 248 provides a sharp shoulder 254 adapted to cooperate with another sharp shoulder 256 formed by junction with the raised portion 252 and the remainder of the locking bar 244. The bar 244 is maintained continuously pressed upwardly by means of a plunger 258, Figs. 5 and 6 resiliently pressed upwardly by means of a spring 260 in a housing on a portion of the bracket auxiliary frame 246, so that when the nozzle valve lever 26 is depressed, as shown in Fig. 6, the same will pull out on the control bar 244 to pull the same to the right, as viewed in that figure, so that the edge of the sharp shoulder 254 on the plate 248 will contact with the corresponding sharp shoulder 256 on the raised portion 252 of the control bar, whereby to hold the control bar 244 in its outermost or locked position as shown in Figure 6. This holds the delivery valve of the dispensing line in open position and the valve spring 14, tending to close the valve, is likewise, through the linkage mechanism 34 and 44 and its connection to the control bar 244, continuously operating to force the control bar 244 to the left, as shown in Fig. 6. This control bar is released automatically by the action of the rotating cams 196, 192, to such a position that the notches 200 and 202 thereof register with the stop members 204 and 206 at which time the stop members will be spring-pressed inwardly to shift the pivotal bracket 212 about its axis 210. Simultaneously, when this depending arm 238 is likewise shifted under the action of the springs 226, which overcome the tension of the small spring 260, thereby forcing the pin 242 to move downwardly to press the locking bar 244 downwardly against the tension of this spring 260, thereby releasing the locking edge 256 of the bar 244 from the locking edge 254 of the plate 248 so that the control bar 244 then shifts automatically to the left to permit the valve 12 to close under the action of its spring 14. The motion of the bar 244 to the left is caused by the spring tension of the valve 12.

The meter shaft 56 extends upwardly through the casing 60 and makes a detachable clutch connection with the shaft 262, which, at its upper end, carries a gear 264 meshing with gear 266 pinned to shaft 268, which is turnable in part of the frame 270. This shaft 268 likewise carries a worm 272 meshing with the worm gear 274, which gear is loosely mounted on a sleeve 276 loosely surrounding shaft 62. One face of the gear 274 is pressed against the cam 192 and the other face contacts an annular radially extending flange 278 on the collar 276. A coil spring 280 surrounds the collar 276, presses against the flange 278 on one hand and against an abutment 282 affixed as by means of screw 284 to rotate with the shaft 62 whereby the worm gear 274 is frictionally clutched to shaft 62. This train of gearing from the meter to the shaft 62 constitutes a means for driving shaft 62 in a clockwise direction from the meter, and this means includes a slip clutch, which permits resetting of the shaft 62 without communicating such motion to the meter.

Figures 10, 13, 14:
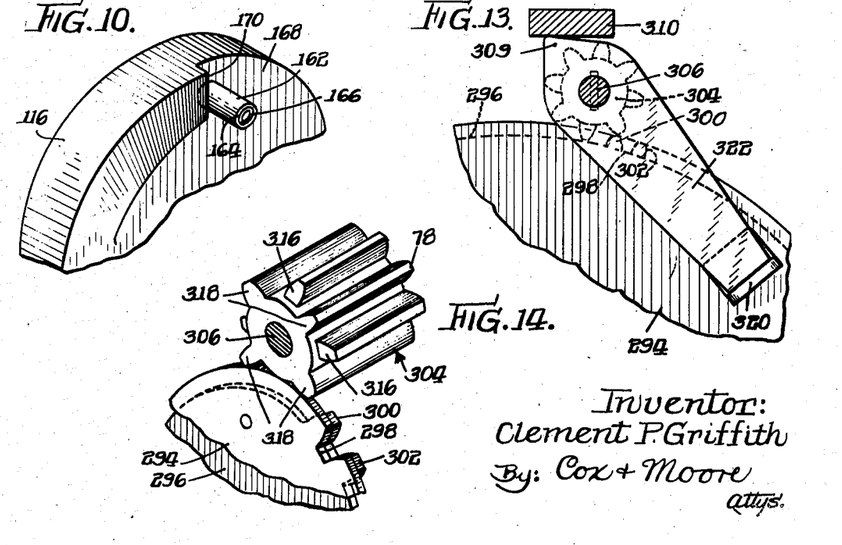
Fig. 10 is a view of the cam on the rear of the fast moving drum.
Fig. 13 is a section taken on line 13—13 of Fig. 4.
Fig. 14 is an enlarged perspective view of the mechanism shown in Fig. 13.

Affixed to the opposite end of shaft 62 (see Figure 4) at the right end thereof, is a collar 286. This flanged collar comprises a radial flange 288 and a threaded end to receive a stop collar 290. Mounted upon this collar 286 is a frictional spring 292 adapted to engage a double disc composed of two members—an inner disc 294 and an outer disc 296 which are welded together. These discs are loosely mounted on this collar 286, and a spring pressed against the flange 288 thereof, hence the disc 294, 296 turns with the shaft 62 through the friction clutch 292. By referring to Figs. 13 and 14 it will be seen that the inner disc 294 is provided with a notch 298, and the outer disc 296 is of slightly smaller diameter; in other words, is provided with a peripherally annular cut away portion. On the outer disc 296 are two teeth 300 and 302 and the space between these teeth registers with the notch 298 in the inner disc 294. Cooperating with the peripheries of these two discs 294 and 296 and the teeth and notch portions thereof is a pinion 304 mounted on a shaft 306 having bearings in the frame of the machine. The opposite end of the shaft 306 is provided with another pinion 308 meshing with gear 312 is resiliently pressed against a shoulder formed by the collar of the sprocket 101 and is pressed by spring 314 carried by the slow moving drum 156 whereby to compel rotation of the slow moving drum when the sprocket 312 is moved, as hereinbefore described. To this end the pinion 304 hereinbefore described and shown in Fig. 14 is provided with teeth to form a Geneva movement between the two discs and the shaft 306. To this end the pinion 304 is provided with eight teeth, alternate teeth being cut away as shown at 316, the distance of the width of the disc 294, the intermediate alternate teeth 318 extending the full width of the pinion 304 to engage in the notch 298. By reason of this construction, upon rotation of the meter shaft in a clockwise direction, the gear 274 will be rotated to rotate shaft 62 to thereby rotate the fast moving hand 118 one complete rotation, and with this one complete rotation by means of the disc 294 and 296, and the Geneva movement to rotate the slow moving hand one stop of the Geneva movement corresponding to fifty (50) gallons, the slow moving hand being locked from movement at any other time by reason of the teeth 318 engaging the outer periphery of the disc 294.

By referring to Fig. 13, it will be seen that means is provided so that when resetting is taking place, the pinion 304 is held from rotation, the friction clutch 292 in the meantime slipping and the friction clutch 314 also slipping. To this end the disc 294 has mounted thereon a stop 320 adapted to engage a pawl arm 322 pivotally mounted on shaft 306. The inner end of the pawl is provided with an extension 309 which is adapted to engage a projection 310 on the frame, the extension of the pawl being located under the projection 310 of the frame to maintain the pawl in angularly outwardly position in the path of movement of the stop 320 on the disc 294. This stop means operates when the disc 294 is turned in a counterclockwise direction during setting operation. When the disc 294 is turned in clockwise direction during meter operation, the stop will rotate under the pawl arm 322 and pass thereby.

Mounted on a suitable portion of the frame 246 is a totalizing mechanism 324 of any desired construction, having a shaft 326 adapted to be driven from the meter shaft 56 or extension 262 in a manner well known in the art. This totalizing mechanism is viewable through an aperture in the face plate 184.

Cam 196, which is the slow moving cam, is larger in diameter than the fast moving cam 192. The former is provided with a notch 202 having a step 202' which has a slightly greater radius than the cam 196. In other words, if the cams 192 and 196 were superposed axially the step in the latter cam would extend slightly beyond the periphery of the former. Cam 192 is formed with a plain peripheral notch as shown at 200.

Pawl or stop 206 is adapted to cooperate with cam 196, the cam serving to retain the stop 206 and also to the stop 204 in withdrawn or cocked position, the stop 204 being held entirely out of contact with its cam. This relation is maintained until the second last transfer of motion to cam 196 is accomplished, whereupon stop 206 will ride into engagement with the step 202' and the pawl 204 will approach the periphery of cam 292. It is preferably retained from contact therewith because of the fact that this cam rotates at a comparatively high speed and if the stop engaged the cam, wearing of the cam surface would follow.

At the last transfer of motion, the step 202' is moved from its position under the pawl 206 and the deep portion of the notch moves into position under the pawl, but the latter does not engage in the notch because at this point the pawl 204 engages the periphery of cam 192. Further rotation of the cam 192 brings notch 200 into alignment with the pawl 204 and the latter seats therein. Coincidentally with this operation, pawl 206 drops into the already aligned notch 202 and dispensing is terminated.

Figures 7, 8:
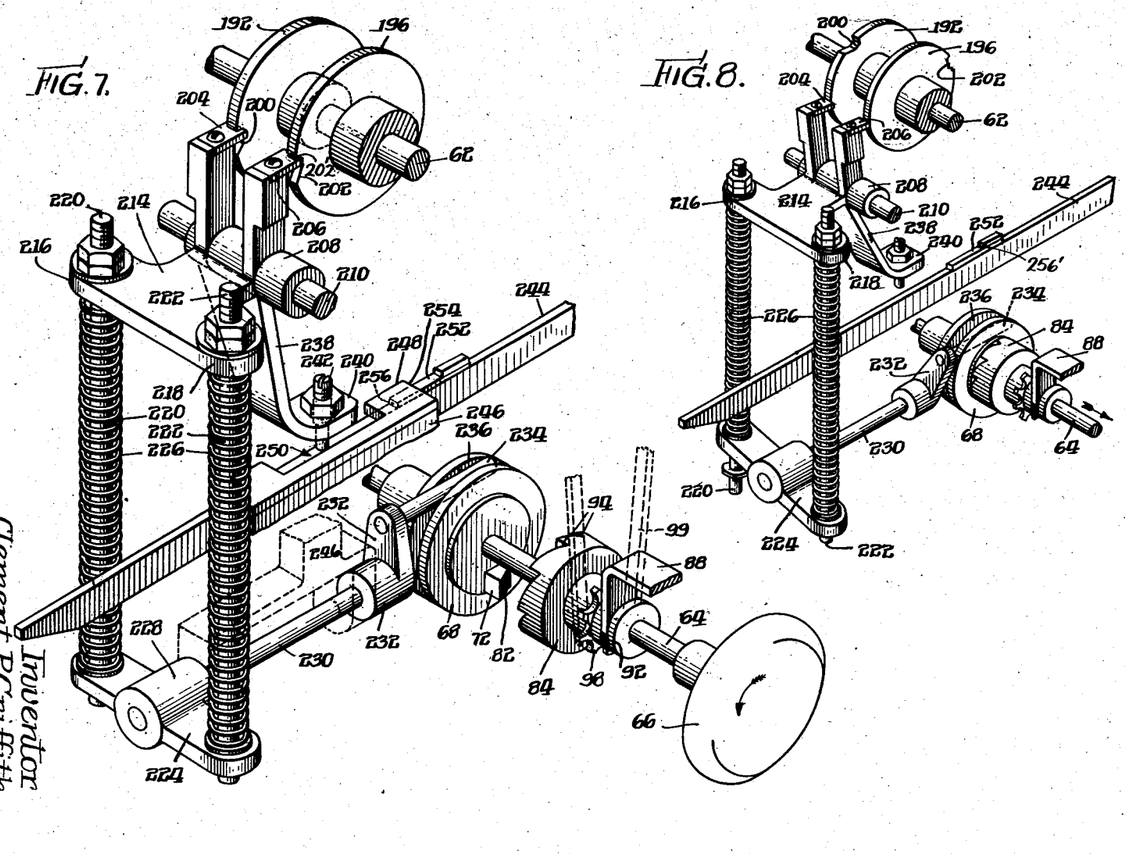
Fig. 7 is a perspective view of the mechanism that is controlled by the push and pull handle.
Fig. 8 is a view of the same, but indicating the parts in position when the control handle has been pulled out.

An inspection of Figure 7 will disclose that the motion of stop 206 from the periphery of the cam 196 to the step 202' will cause a depression of stop or tappet 242 with the result that the shoulder 256 is released from its engagement with shoulder 254 and the bar 244 will move to the left under action of the valve spring until the next shoulder 256' engages shoulder 254. In this position the valve will be partly closed and the flow of fluid will be reduced so as to prevent spillage of fluid due to a too great rate of discharge.

Likewise, motion of stop 204 from the periphery of cam 292 into notch 200 and the motion of stop 206 into notch 202 produces a second depression of bar 244 and effects the release of shoulder 256' from the restraint of shoulder 254 with the result that bar 244 is freed for a second leftward motion under action of the valve spring and the valve will be permitted to close.

Thus, it will be observed that the flow near the completion of a dispensing operation is first reduced and then finally terminated. The minimum quantity of fluid discharged at the slow rate of flow may vary but it is preferably fifty gallons. This is accomplished in the following manner:

It is apparent that in the final position, the notches 200—202 and pawls 204—206 must be in alignment, whereas at the start of the operation the notch 200 will be displaced from final position in a counterclockwise direction (Fig. 7) by from 1/50th to 49/50ths of a revolution depending upon the gallonage to be delivered, while notch 202 will be displaced in a counterclockwise direction anywhere from 1/40th to 39/40ths of a revolution. The transfer mechanism is always returned to the position shown in Figure 13 wherein an entire revolution of shaft 62 and pinion 294 is required to effect a transfer of motion from shaft 62 to the sleeve 136. This transfer is accomplished during the last 1/50th part of the revolution of shaft 62.

If we assume that the delivery is to be of 150 gallons of liquid, the cam 196 will be moved counterclockwise (Figure 7) three notches of ratchet 146 and cam 192 will remain at the zero position. At the end of the first revolution of shaft 62 and indicator 118, cam 196 and indicator 172 will move up 1/40th of a revolution, equivalent to one notch of the ratchet. The second revolution of shaft 62 will, through the transfer, move the step 202' into alignment with stop 206 so that during the next and final revolution of shaft 62 the discharge of liquid will be carried on at a reduced rate until the last transfer is accomplished. At this time both stops 204 and 206 will be in position adjacent to the notches 200 and 202 respectively and, as a result, they will be forced into engagement therewith to stop the flow.

If the delivery involved had been any amount between 150 and 200, as for instance 199, the cam 192 would have been originally displaced 49/50ths from its zero position and would occupy this position at the time each transfer took place with the result that when the transfer of cam 196 from the position in which the step 202' is aligned with the stop occurs, the cam 192 would still have 49/50ths of its motion remaining to be made after 50 gallons had already been discharged at the slow rate. Consequently, an additional 49 gallons would be discharged at the slow rate making a total of 99 gallons delivered at said slow rate as against 100 gallons which had been previously delivered at the fast or maximum rate.

*Operation*

To set the dials to deliver 416 gallons, the first operation is to set the hands of the customer's dial to zero by pushing in upon the control knob and turning it counterclockwise. In the manner hereinbefore described, the hands will be turned to zero, at which time they will automatically and positively stop squarely at the zero mark. In order to set the customer's dials to the proper amount, say 416 gallons, the operator still continues to turn the control knob counterclockwise, whereby through mechanism hereinbefore described, the small central customer's dials 114 of the predetermining mechanism carrying the numeral 16 coincides with the small pointer 122. The next operation is to pull out on the control knob 66 and turn it counterclockwise, which, through the clutch mechanism breaks the driving connection with the chain 104 and makes driving contact with the chain 99 to thereby turn the intermediate dial 144 on the slow moving drum in the counterclockwise direction until the 400 gallon mark on this dial registers with the arrow 190 on the stationary face plate or dial. From the foregoing, it will be noted that a large single knob controls the setting of all three dials and that this knob is always turned in the same direction, to-wit: counterclockwise. If the control knob 66 is turned clockwise, it will be ineffectual to turn the sprockets either 98 or 100, due to the clutch teeth. They will ride ineffectually over the clutch teeth of the corresponding member. It will be further noted that this knob 66 automatically returns to central position when released after setting, due to the operation of the springs 226, as hereinbefore described.

Figure 1:
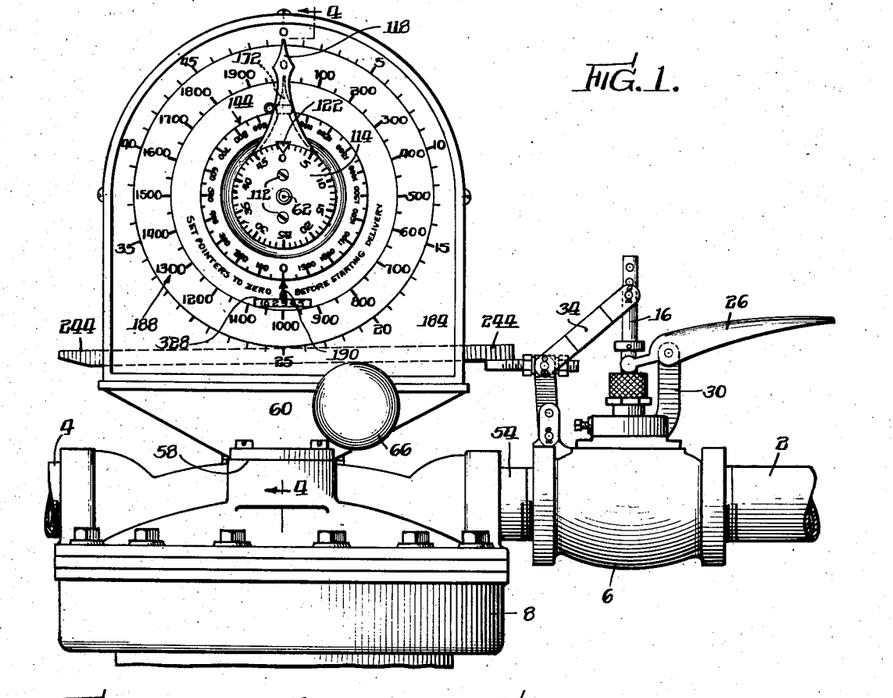
Fig. 1 is a front view of a preferred form of my apparatus.
Figure 2:
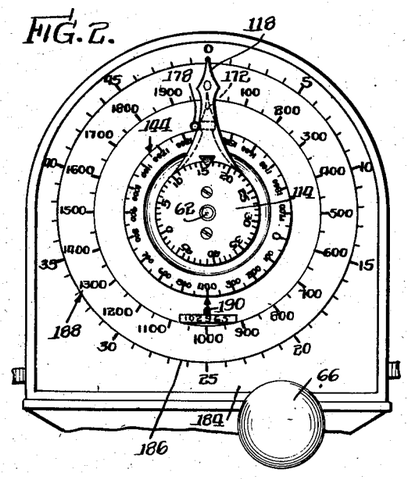
Figs. 2 and 3 are views of the dial in different positions.
Figure 3:
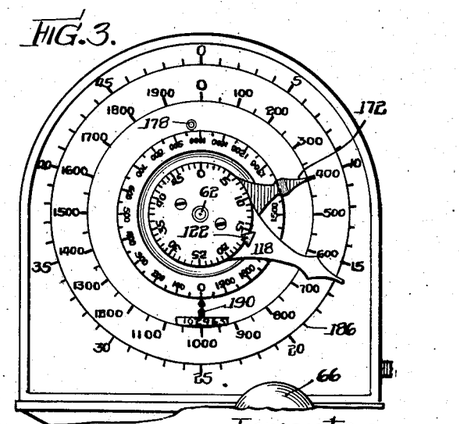

Now, to start the flow of liquid after the meter has been given a predetermined setting, the handle 26 is pressed down and as the flow progresses, the customer's dial hands advance clockwise until the exact quantity of 416 gallons has been discharged. At this point the flow is automatically stopped due to the fact that the two cams 192 and 196, which have been driven in clockwise direction during the operation of the meter through the train of gearing hereinbefore described, will bring the cut-out notches 200 and 202 opposite the stops 204 and 206, which through the mechanism hereinbefore described, permits the locking mechanism on the control bar 244 and its plate 248 to be released to permit the valve to be spring-pressed to closed position. At the end of the delivery, the customer's dial hands will indicate a delivery of 416 gallons corresponding with the amount for which the predetermining dials were set. Figure 3 illustrates the position of the customer's dial hands and the predetermining dials at the end of the 416 gallon delivery.

If the same quantity of 416 gallons is to be repeated, it is only necessary to return the customer's dial hands to zero by pushing in on the control knob 66 and turning the same in a counterclockwise direction as hereinbefore described. After these hands have thus been returned to zero setting merely by pressing down on the handle of the handle 26, the valve will repeat the automatic delivery of 416 gallons without resetting the control dials and this repetition of 416 gallons can take place as many times as desired, each time that the customer's dial hands are reset to zero position and the valve handle 26 depressed.

If the quantity of 416 gallons is to be changed to 225 gallons, the first operation is to return the customer's dial hands to zero as hereinbefore described, and then advance the small central predetermining dial 114 in the manner hereinbefore described, from 16 to 25, and then return the intermediate dial 144 to zero and advance it to 200. If the quantity of 416 gallons is to be changed to 510 gallons, the first operation is to return the customer's dial hands to zero; next return the small central dial to zero and set it to 10, then advance the intermediate dial 144 from 400 to 500 gallons. If the quantity of 416 gallons is to be changed to 35, the first operation is to return the customer's dial hands to zero; next advance the small central dial from 16 to 35 and then return the intermediate dial to zero.

For setting the customer's hands to zero, it is necessary to push in on the knob and turn it counterclockwise. That turns the fast moving hand counterclockwise until it strikes the stop, and then that picks up the slow moving hand and both hands move until the slow hand strikes its zero stop, at which time both hands are reset to zero. During this resetting movement the cams are moved a corresponding angular amount with setting shaft 62 and in a counterclockwise direction so that they occupy the position which they occupied at the start of the preceding delivery. The next movement is a continued movement in a counterclockwise direction of the controlling knob when pushed in which will then set the small dial to the gallonage desired. This simultaneously sets the corresponding cam 192. After this small dial has been set, the operator then pulls outwardly on control knob and turns it counterclockwise. This sets the larger dial 144 to its gallonage predetermining position and simultaneously therewith its cam 196 is turned to a corresponding annular position. During the resetting of the hands, the shipper rod 234 has by its actions, pulled the knock-out stops 204 and 206 laterally out of contact with the notches in the cams so as to permit the rotation of the setting shaft 62.

When the fast moving hand is reset from its 16 indication on the large dial back to zero, the small dial moves in a similar counterclockwise direction with it, the arrow 122 constantly being on the 16 calibration of the small dial. Also, when the slow moving hand is moved back to zero, the larger dial moves counterclockwise to return the 400 reading back to the arrow 190, whereby this dial now reads 400. In other words, in a resetting operation, both hands and both dials are rotated an equal amount. During this rotation the cams are likewise moved the same angular distance so that after resetting, if it be desired to repeat the quantity delivered, it is only necessary to open the control valve, at which time the meter will then drive the cams in a clockwise direction until the notches therein come past the knock-out steps, which will permit the same to drop into the notches and cause the valve to close and dispensing to cease.

When the hands have been reset to zero position, if it be desired to change the setting of the dials, this is accomplished first by pushing in on the control knob and turning the same counterclockwise to reset the smaller dial to desired position, and then pulling out on the control knob and turning clockwise to reset the larger dial to its position. During this further setting of the dials, the hands having been held at the zero position by the hand stop mechanism hereinbefore described, the friction slip clutch mechanism shown in Figs. 9 and 12 at 126 and 152 respectively, will function to permit the setting of the dials without moving the hands. It will be noted that gears are provided with teeth into which pawls 126 and 152 fall, the arrangement being such that the gear is always positioned for some particular gallonage by the pawl and spring, since each gear is a 50-tooth gear and moves angularly a distance corresponding to a gallon or multiple of a gallon indication calibration on the respective dial.

I claim:

1. A predetermining device comprising an indicator including a stationary dial and fast and slow moving hands drivable in one direction with respect to said stationary dial, a graduated scale movable with each of said hands when the same are driven with respect to the stationary dial, stationary index means operatively associated with one of said scales, an index stationary with respect to one of the hands and operatively associated with the other scale, manually operable means to turn the hands in a direction opposite from that in which the same may be driven in order to adjust the hands to an initial or starting position and to shift said scales relatively with respect to said hands, and actuatable means operably associated with said scales and adapted for actuation upon predetermined movement of the same with said hands when the hands are driven as aforesaid.

2. A control device comprising an indicator of the clock dial type having a stationary graduated scale and a pair of indicator hands drivable in one direction to travel said scale, and predetermining mechanism adjustable to cause actuation of an operable device after predetermined movement of the indicating hands with respect to said dial, said predetermining mechanism comprising a dial shiftable with each hand when the same are being driven, a stationary index co-operatively associated with one of said movable dials, index means carried by one of said hands in position to co-operate with the other of said movable dials, and means to shift said movable dials independently of said hands in order to adjust the same each with respect to its associated index.

3. A control for use in connection with cyclically operable apparatus comprising a pair of movable indicators drivable in response to the occurrence of controlling conditions accompanying the operation of said apparatus in order to indicate the operation of said apparatus and predetermining means for causing actuation of an operable device when said indicating elements reach a predetermined indicating position, said predetermining means comprising scale elements movable with said indicator elements when the same are driven as aforesaid, an index co-operatively associated with each of said scale elements, at least one of said indices being stationary with one of said indicator elements, and manually operable means to adjustably shift said scale elements each with respect to its associated indicator element.

4. A control for use in connection with cyclically operable apparatus comprising a movable indicator drivable in response to the occurrence of controlling conditions accompanying the operation of said apparatus in order to indicate the operation of said apparatus and predetermining means for causing actuation of an operable device when said indicating element reaches a predetermined indicating position, said predetermining means comprising a scale element movable with said indicator element when the same is driven as aforesaid, an index carried by said indicator element in position to cooperate with said scale element, and means to move the scale element with respect to and independently of the indicator element in order to adjust the control.

5. A control for use in connection with cyclically operable apparatus comprising a pair of movable indicators drivable in response to the occurrence of controlling conditions accompanying the operation of said apparatus in order to indicate the operation of said apparatus and predetermining means for causing actuation of an operable device when said indicating elements reach a predetermined indicating position, said predetermining means comprising a scale element movable with one of said indicator elements when the same is driven as aforesaid, an index co-operatively associated with said scale element, and means to move said scale element independently of said indicator element in order to adjust the same to a predetermined setting with respect to said index.

6. A control as set forth in claim 5, wherein said scale element carries a cam, a cam follower operatively associated with said cam and adapted to be actuated thereby in order, in turn, to operate the actuatable device.

7. In a quantity indicating mechanism, the combination of a meter driven, continuously rotating first shaft having an indicator attached thereto, a second shaft having an indicator attached thereto, transfer means so arranged that said second shaft is intermittently driven by said first shaft, means for resetting said transfer means and said indicators to predetermined positions so that the transfer will always occur at a predetermined phase in the cycle of rotation of said first shaft.

8. In a quantity predetermining device, a setting mechanism comprising operating means adapted to be moved to either of two operating positions or to a neutral position, a stop mechanism for controlling the operation of said device, resilient means connected to operate said stop mechanism, said resilient means being also connected with said operating means so as to yieldingly retain it in its neutral position.

9. In a control device, the combination of fast and slow cams, means for intermittently driving said slow cam at a definite speed ratio relative to said fast cam, a follower for said cams, a control mechanism having actuated, intermediate and home positions, connections between said follower and said control mechanism, said slow cam being formed to operate said follower and said control mechanism from actuated position to intermediate positions, and after a predetermined period to transfer the operation of said follower and control mechanism to said fast cam, said fast cam being formed to operate said control mechanism from intermediate position to home position.

CLEMENT P. GRIFFITH.